United States Patent
Fujimoto et al.

(10) Patent No.: US 9,696,075 B2
(45) Date of Patent: Jul. 4, 2017

(54) CONTAINER REFRIGERATION DEVICE

(71) Applicant: DAIKIN INDUSTRIES, LTD., Osaka-shi, Osaka (JP)

(72) Inventors: Yuusuke Fujimoto, Osaka (JP); Kazuma Yokohara, Osaka (JP); Atsushi Okamoto, Beijing (CN)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 458 days.

(21) Appl. No.: 14/363,212

(22) PCT Filed: Dec. 6, 2012

(86) PCT No.: PCT/JP2012/007836
§ 371 (c)(1),
(2) Date: Jun. 5, 2014

(87) PCT Pub. No.: WO2013/084501
PCT Pub. Date: Jun. 13, 2013

(65) Prior Publication Data
US 2015/0047381 A1 Feb. 19, 2015

(30) Foreign Application Priority Data
Dec. 9, 2011 (JP) .................. 2011-270622

(51) Int. Cl.
*F25D 17/00* (2006.01)
*F25B 49/02* (2006.01)
(Continued)

(52) U.S. Cl.
CPC ............ *F25B 49/02* (2013.01); *F25B 49/022* (2013.01); *F25D 11/003* (2013.01); *F25D 17/06* (2013.01);
(Continued)

(58) Field of Classification Search
CPC .. F25B 49/02; F25B 41/04; F25B 2600/2513; F25B 6/04; F25B 40/00; F25B 49/022;
(Continued)

(56) References Cited

U.S. PATENT DOCUMENTS 4,873,649 A * 10/1989 Grald .................. F24F 11/0009
62/176.6
5,144,812 A * 9/1992 Mills, Jr. .................. F24F 1/06
62/186
(Continued)

FOREIGN PATENT DOCUMENTS

JP 6-50616 A 2/1994
JP 6-109352 A 4/1994
(Continued)

OTHER PUBLICATIONS

International Search Report issued in PCT/JP2012/007836, mailed on Feb. 26, 2013.

Primary Examiner — Jianying Atkisson
Assistant Examiner — Miguel A Diaz
(74) Attorney, Agent, or Firm — Birch, Stewart, Kolasch & Birch, LLP

(57) ABSTRACT

A container refrigeration device includes: a fan controller which reduces a rotation speed of an inside fan when a temperature inside a container is stabilized; and a rotation speed controller which reduces an operational rotation speed N of a compressor such that the temperature inside the container becomes equal to a target temperature as the fan controller reduces the rotation speed of the inside fan.

8 Claims, 5 Drawing Sheets

(51) Int. Cl.
*F25D 11/00* (2006.01)
*F25D 17/06* (2006.01)

(52) U.S. Cl.
CPC ... *F25B 2400/13* (2013.01); *F25B 2600/0253* (2013.01); *F25B 2600/11* (2013.01); *F25B 2600/111* (2013.01); *F25B 2600/112* (2013.01); *F25B 2600/2509* (2013.01); *F25B 2600/2513* (2013.01); *F25B 2700/1931* (2013.01); *F25B 2700/1933* (2013.01); *F25B 2700/21151* (2013.01); *F25B 2700/21152* (2013.01); *F25B 2700/21171* (2013.01); *F25B 2700/21175* (2013.01); *Y02B 30/741* (2013.01); *Y02B 30/743* (2013.01)

(58) Field of Classification Search
CPC  F25B 2400/13; F25B 5/04; F25B 2341/0662; F25B 41/062; F25B 2500/19; F25B 2600/0253; F25B 2400/05; F25B 2600/25; F25B 2600/11; F25B 2600/112; F25B 2700/2104; F25B 2600/2509; F25B 2700/21175; F25B 2700/21151; F25B 2700/21152; F25B 2700/1931; F25B 2700/21171; F25B 2600/111; F25B 2700/1933; B60H 1/00921; B60H 1/00; B60H 1/32; B60H 1/3204; F24F 11/006; F24F 11/008; F24F 11/0012; F24F 2011/0082; F24F 11/001; F24F 11/0086; B60P 3/20; F25D 17/06; F25D 11/003; Y02B 30/743; Y02B 30/741
See application file for complete search history.

(56) References Cited

U.S. PATENT DOCUMENTS

| | | | | |
|---|---|---|---|---|
| 5,404,729 A * | 4/1995 | Matsuoka | B60H 1/00007 | 62/179 |
| 5,477,700 A * | 12/1995 | Iio | B60H 1/00392 | 62/196.4 |
| 5,605,053 A * | 2/1997 | Otori | F24F 11/0009 | 62/160 |
| 6,032,473 A * | 3/2000 | Morimoto | F25B 9/006 | 62/205 |
| 6,481,388 B1 * | 11/2002 | Yamamoto | F01P 7/044 | 123/41.1 |
| 6,829,523 B2 * | 12/2004 | Hanson | G05D 23/1902 | 165/200 |
| 6,935,125 B2 * | 8/2005 | Wakuda | B60H 1/00735 | 62/160 |
| 7,863,839 B2 * | 1/2011 | Schuricht | F01P 7/044 | 123/41.12 |
| 7,921,816 B2 * | 4/2011 | Okuda | E02F 9/226 | 123/41.12 |
| 9,316,423 B2 * | 4/2016 | Yokohara | F25B 41/04 | |
| 9,551,269 B2 * | 1/2017 | Mizoguchi | F16D 65/78 | |
| 9,574,660 B2 * | 2/2017 | Schmidt | F16H 61/423 | |
| 2002/0134095 A1 * | 9/2002 | Temmyo | F25B 5/02 | 62/179 |
| 2003/0182957 A1 * | 10/2003 | Hu | F25D 17/065 | 62/228.4 |
| 2006/0080989 A1 * | 4/2006 | Aoki | F25B 40/00 | 62/324.4 |
| 2007/0186581 A1 * | 8/2007 | Mistry | F04B 39/06 | 62/505 |
| 2009/0241573 A1 * | 10/2009 | Ikegami | B60H 1/00335 | 62/238.7 |
| 2010/0198416 A1 * | 8/2010 | Kasahara | F25B 13/00 | 700/282 |
| 2010/0307174 A1 | 12/2010 | Kernkamp | | |
| 2011/0144811 A1 | 6/2011 | Liu | | |
| 2011/0197601 A1 * | 8/2011 | Booth | F24F 11/008 | 62/89 |
| 2012/0042674 A1 * | 2/2012 | Takenaka | F24F 3/06 | 62/180 |
| 2012/0090337 A1 * | 4/2012 | Chen | F25B 30/02 | 62/79 |
| 2012/0253543 A1 * | 10/2012 | Laughman | F25B 49/02 | 700/300 |
| 2012/0272673 A1 * | 11/2012 | Yokohara | F25B 41/04 | 62/180 |
| 2013/0227978 A1 * | 9/2013 | Kawai | F25B 49/02 | 62/160 |
| 2013/0305751 A1 * | 11/2013 | Gomes | F25D 11/02 | 62/89 |
| 2014/0140810 A1 * | 5/2014 | Balistreri | F04D 19/002 | 415/1 |
| 2014/0174114 A1 * | 6/2014 | Tamaki | F25B 45/00 | 62/129 |
| 2014/0230466 A1 * | 8/2014 | Noll | F04C 23/001 | 62/89 |
| 2014/0230467 A1 * | 8/2014 | Noll | F04C 23/001 | 62/89 |
| 2015/0075766 A1 * | 3/2015 | Alston | F25B 49/02 | 165/287 |
| 2015/0128628 A1 * | 5/2015 | Kawagoe | F25B 13/00 | 62/160 |
| 2015/0158369 A1 * | 6/2015 | Greiner | F25D 17/067 | 62/89 |
| 2015/0204594 A1 * | 7/2015 | Luo | F25B 49/022 | 62/115 |

FOREIGN PATENT DOCUMENTS

| | | | |
|---|---|---|---|
| JP | 06109352 A * | 4/1994 | |
| JP | 9-203578 A | 8/1997 | |
| JP | 10-019441 A | 1/1998 | |
| JP | 2005-076922 A | 3/2005 | |
| JP | WO 2013084501 A1 * | 6/2013 | ............ F25B 49/022 |

* cited by examiner

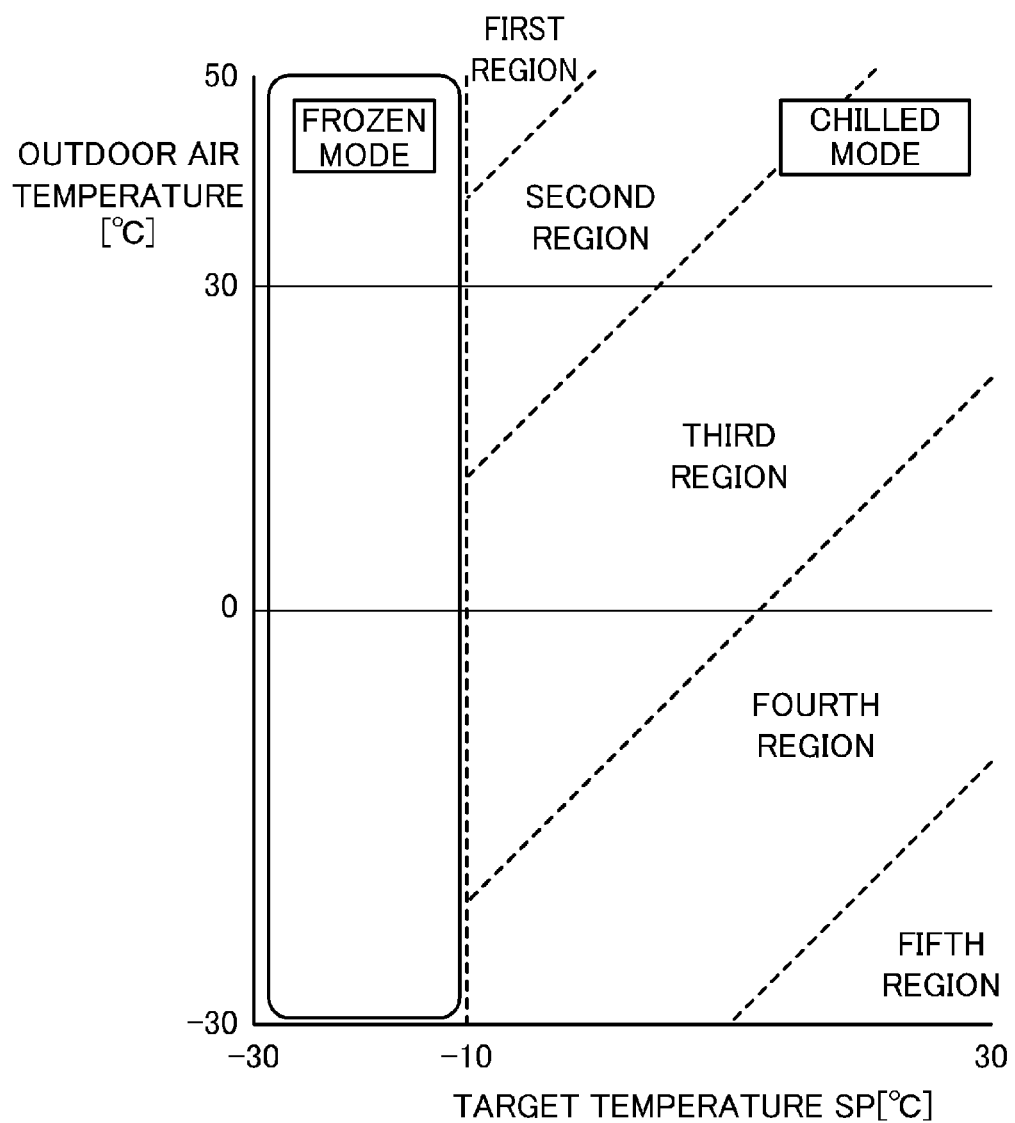

CONTAINER REFRIGERATION DEVICE

TECHNICAL FIELD

The present disclosure relates to container refrigeration devices, and in particular, to energy saving operation of the container refrigeration devices.

BACKGROUND ART

Transport containers configured to transport goods such as foods by land or see while maintaining the goods at a low temperature have been conventionally known. The transport containers include a container refrigeration device as disclosed in Patent Document 1. The container refrigeration device includes a refrigerant circuit and cools air in the container by means of an evaporator provided in the refrigerant circuit.

CITATION LIST

Patent Document

Patent Document 1: Japanese Unexamined Patent Publication No. H09-203578

SUMMARY OF THE INVENTION

Technical Problem

In recent years, there has been an increasing demand for container refrigeration devices to save energy as much as possible while ensuring the quality of goods in containers.

However, the conventional container refrigeration devices are configured to cool the inside of a container to ensure the quality of goods by controlling an inside fan such that the fan constantly operates at the maximum rotation speed. Accordingly, the conventional container refrigeration devices have the disadvantage of being incapable of performing energy saving operation while ensuring the quality of goods.

It is therefore an object of the present disclosure to enable a container refrigeration device to perform energy saving operation while ensuring the quality of goods in a container.

Solution to the Problem

A first aspect of the present disclosure relates to a container refrigeration device with a refrigerant circuit (20) including a compressor (30), a condenser (31), an expansion mechanism (32), and an evaporator (33) which are sequentially connected together, and with an inside fan (36) configured to blow inner air having exchanged heat in the evaporator (33) of the refrigerant circuit (20) to an inside of a container, where a rotation speed of the inside fan (36) is variable, wherein the container refrigeration device includes a fan controller (104) which reduces the rotation speed of the inside fan (36) when a temperature inside the container is stabilized, and a rotation speed controller (102) which reduces an operational rotation speed N of the compressor (30) such that the temperature inside the container becomes equal to a target temperature, as the fan controller (104) reduces the rotation speed of the inside fan (36).

According to the first aspect, in the refrigerant circuit (20), a refrigerant discharged from the compressor (30) is condensed in the condenser (31). Thereafter, the refrigerant expands in the expansion mechanism (32), and then, evaporates in the evaporator (33). In the evaporator (33), the refrigerant and inner air of the container exchange heat, thereby cooling the inner air of the container. The inside fan (36), of which the rotation speed is variable, blows the cooled air having exchanged heat in the evaporator (33) to the inside of the container.

The fan controller (104) reduces the rotation speed of the inside fan (36) when the temperature inside the container is stabilized. When the fan controller (104) reduces the rotation speed of the inside fan (36), heat generated by a motor of the inside fan (36) decreases. Cooling performance of the container refrigeration device becomes excessive corresponding to the decrease in the heat generated by the motor of the inside fan (36), and accordingly, the temperature inside the container becomes lower than the target temperature. In that case, the rotation speed controller (102) reduces the operational rotation speed N of the compressor (30). Consequently, the flow rate of the refrigerant circulating through the refrigerant circuit (20) decreases, and the cooling performance of the container refrigeration device decreases, thereby maintaining the temperature inside the container at the target temperature.

A second aspect relates to the container refrigeration device of the first aspect, further including a corrector (105), wherein the rotation speed controller (102) is configured to reduce the operational rotation speed N of the compressor (30) by a predetermined value A such that the temperature inside the container becomes equal to the target temperature, as the fan controller (104) reduces the rotation speed of the inside fan (36), the corrector (105) performs correction to reduce the predetermined value A when the temperature inside the container becomes higher than the target temperature because of operation at an operational rotation speed (N−A) reduced by the rotation speed controller (102), and the corrector (105) performs correction to increase the predetermined value A when the temperature inside the container becomes lower than the target temperature because of the operation at the operational rotation speed (N−A) adjusted by the rotation speed controller (102).

According to the second aspect, when the temperature inside the container is stabilized, the fan controller (104) reduces the rotation speed of the inside fan (36), and the rotation speed controller (102) reduces the operational rotation speed N of the compressor (30) by the predetermined value A. If the temperature inside the container becomes higher than the target temperature because of the operation at the operational rotation speed (N−A) adjusted by the rotation speed controller (102), the corrector (105) performs correction to reduce the predetermined value A. Consequently, the compressor (30) operates at the operational rotation speed (N−A1), which is based on a corrected value A1 (A1<A) and higher than the operational rotation speed (N−A) before the correction. As a result, the flow rate of the refrigerant flowing through the refrigerant circuit (20) increases, and the temperature inside the container can be caused to approach the target temperature.

On the other hand, if the temperature inside the container becomes lower than the target temperature because of the operation at the operational rotation speed (N−A) adjusted by the rotation speed controller (102), the corrector (105) performs correction to increase the predetermined value A. Consequently, the compressor (30) operates at the operational rotation speed (N−A2), which is based on a corrected value A2 (A<A2) and lower than the operational rotation speed (N−A) before the correction. As a result, the flow rate of the refrigerant flowing through the refrigerant circuit (20)

decreases, and the temperature inside the container can be caused to approach the target temperature.

A third aspect relates to the container refrigeration device of the first or second aspect, further including a valve controller (103), wherein the expansion mechanism (32) is an expansion valve (32) having a variable opening degree, and the valve controller (103) reduces the opening degree of the expansion valve (32) as the fan controller (104) reduces the rotation speed of the inside fan (36).

According to the third aspect, the expansion mechanism (32) is the expansion valve (32) whose opening degree is variable. When the temperature inside the container is stabilized and the fan controller (104) reduces the rotation speed of the inside fan (36), the valve controller (103) reduces the opening degree of the expansion valve (32).

Specifically, when the temperature inside the container is stabilized, the fan controller (104) reduces the rotation speed of the inside fan (36), and heat generated by the motor of the inside fan (36) decreases. Consequently, the cooling performance of the container refrigeration device becomes excessive corresponding to the decrease in the heat generated by the motor of the inside fan (36), and accordingly, the temperature inside the container becomes lower than the target temperature. In that case, the valve controller (103) reduces the opening degree of the expansion valve (32). Consequently, the flow rate of the refrigerant flowing from the expansion valve (32) into the evaporator (33) decreases, and the cooling performance of the container refrigeration device decreases, thereby maintaining the temperature inside the container at the target temperature.

A fourth aspect relates to the container refrigeration device of any one of the first to third aspects, wherein the fan controller (104) increases the reduced rotation speed of the inside fan (36) when the temperature inside the container is stabilized, and the rotation speed controller (102) increases the operational rotation speed N of the compressor (30) such that the temperature inside the container becomes equal to the target temperature, as the fan controller (104) increases the rotation speed of the inside fan (36).

According to the fourth aspect, when the temperature inside the container is stabilized, the fan controller (104) increases the reduced rotational speed of the inside fan (36). When the fan controller (104) increases the rotation speed of the inside fan (36), heat generated by the motor of the inside fan (36) increases. The cooling performance of the container refrigeration device becomes insufficient corresponding to the increase in the heat generated by the motor of the inside fan (36), and accordingly, the temperature inside the container becomes higher than the target temperature. In that case, the rotation speed controller (102) increases the operational rotation speed N of the compressor (30). Consequently, the flow rate of the refrigerant circulating through the refrigerant circuit (20) increases, and the cooling performance of the container refrigeration device increases, thereby maintaining the temperature inside the container at the target temperature.

When the rotation speed of the inside fan (36) is increased, air blown out from the container refrigeration device is distributed entirely inside the container and agitates the inner air of the container, thereby making uniform the temperature distribution in the container.

A fifth aspect relates to the container refrigeration device of the fourth aspect, further including a corrector (105), wherein the rotation speed controller (102) is configured to increase the operational rotation speed N of the compressor (30) by a predetermined value B such that the temperature inside the container becomes equal to the target temperature, as the fan controller (104) increases the rotation speed of the inside fan (36), the corrector (105) performs correction to increase the predetermined value B when the temperature inside the container becomes higher than the target temperature because of operation at an operational rotation speed (N+B) adjusted by the rotation speed controller (102), and the corrector (105) performs correction to reduce the predetermined value B when the temperature inside the container becomes lower than the target temperature because of the operation at the operational rotation speed (N+B) adjusted by the rotation speed controller (102).

According to the fifth aspect, when the temperature inside the container is stabilized, the fan controller (104) increases the reduced rotational speed of the inside fan (36). The rotation speed controller (102) accordingly increases the operational rotation speed N of the compressor (30) by the predetermined value B. When the temperature inside the container becomes higher than the target temperature because of the operation at the operational rotation speed (N+B) adjusted by the rotation speed controller (102), the corrector (105) performs correction to increase the predetermined value B. Accordingly, the compressor (30) operates at the operational rotation speed (N+B1), which is based on a corrected value B1 (B1>B) and higher than the operational speed (N+B) before the correction. Consequently, the flow rate of the refrigerant flowing through the refrigerant circuit (20) increases, and the temperature inside the container is caused to approach the target temperature.

On the other hand, when the temperature inside the container becomes lower than the target temperature because of the operation at the operational rotation speed (N+B) adjusted by the rotation speed controller (102), the corrector (105) performs correction to reduce the predetermined value B. Accordingly the compressor (30) operates at the operational rotation speed (N+B2), which is based on a corrected value B2 (B2<B) and lower than the operational rotation speed (N+B) before the correction. Consequently, the flow rate of the refrigerant flowing through the refrigerant circuit (20) decreases, and the temperature inside the container is caused to approach the target temperature.

A sixth aspect relates to the container refrigeration device of the fourth or fifth aspect, further including a valve controller (103), wherein the expansion mechanism (32) is an expansion valve (32) having a variable opening degree, and the valve controller (103) increases the opening degree of the expansion valve (32) as the fan controller (104) increases the rotation speed of the inside fan (36).

According to the sixth aspect, the expansion mechanism (32) is the expansion valve (32) whose opening degree is variable. When the temperature inside the container is stabilized and the fan controller (104) increases the rotation speed of the inside fan (36), the valve controller (103) increases the opening degree of the expansion valve (32).

Specifically, when the temperature inside the container is stabilized, the fan controller (104) increases the rotation speed of the inside fan (36), and heat generated by the motor of the inside fan (36) increases. Consequently, the cooling performance of the container refrigeration device becomes insufficient corresponding to the increase in the heat generated by the motor of the inside fan (36), and accordingly, the temperature inside the container becomes higher than the target temperature. In that case, the valve controller (103) increases the opening degree of the expansion valve (32). Consequently, the flow rate of the refrigerant flowing from the expansion valve (32) into the evaporator (33) increases, and the cooling performance of the container refrigeration device increases, thereby maintaining the temperature inside the container at the target temperature.

A seventh aspect relates to the container refrigeration device of any one of the first to sixth aspects, wherein the rotation speed of the inside fan (36) is switchable between at least two speeds including a higher speed and a lower speed, and the fan controller (104) is configured to perform switching control to switch the rotation of the inside fan (36) between the higher speed and the lower speed at predetermined intervals.

According to the seventh aspect, the rotation speed of the inside fan (36) is switchable between the at least two speeds including the higher speed and the lower speed, and the fan controller (104) is configured to perform switching control of the rotation speed of the inside fan (36). The switching control is performed such that the rotation of the inside fan (36) is switched between the higher speed and the lower speed at the predetermined intervals. Specifically, when the inside fan (36) is controlled to operate at the higher speed, air blown out from the container refrigeration device is distributed entirely inside the container and agitates the inner air of the container, thereby making uniform the temperature distribution in the container.

An eighth aspect relates to the container refrigeration device of the seventh aspect, wherein when a temperature of suction air sucked from the inside of the container is equal to or lower than a predetermined temperature during the switching control, the fan controller (104) performs low speed control to cause the inside fan (36) to operate continuously at the lower speed.

According to the eight aspect, the fan controller (104) performs switching control of the inside fan (36). When the temperature of suction air sucked from the inside of the container is equal to or lower than a predetermined temperature during the switching control, the fan controller (104) causes the inside fan (36) to operate continuously at the lower speed. Consequently, the container refrigeration device can perform energy saving operation. Specifically, when the temperature of suction air is lower than the predetermined temperature, the inside of the container is entirely maintained at the target temperature even with the inside fan (36) operating at the lower speed. Therefore, the inside fan (36) is caused to operate at the lower speed, which can save more energy.

On the other hand, if the temperature of suction air sucked from the inside of the container is higher than the predetermined temperature, the fan controller (104) switches the rotation of the inside fan (36) to the higher speed. As a result, air blown out from the container refrigeration device is distributed entirely inside the container and agitates the inner air of the container, thereby making uniform the temperature distribution in the container and causing the sucked air to approach the predetermined temperature.

Advantages of the Invention

According to the first aspect, when the temperature inside the container is stabilized, the operational rotation speed N of the compressor (30) is reduced as the rotation speed of the inside fan (36) is reduced. Accordingly, the cooling performance to cool the inside of the container can be reduced by the amount of the reduction in heat caused by the reduced rotation speed of the motor of the inside fan (36). Consequently, an amount of energy corresponding to the reduction in the rotation speed of the inside fan (36) can be saved while maintaining the temperature inside that container at the target temperature. As a result, the container refrigeration device can perform energy saving operation while ensuring the quality of goods in the container.

According to the second aspect, the predetermined value A is corrected according to a change in the temperature inside the container caused by a reduction in the rotation speed of the inside fan (36). Accordingly, the operational rotation speed of the compressor (30) can be set appropriately according to the change in the temperature inside the container. As a result, it is possible to cause the temperature inside the container to approach the target temperature.

According to the third aspect, since the opening degree of the expansion valve (32) is reduced in accordance with the reduction in the rotation speed of the inside fan (36), the cooling performance of the container refrigeration device can be reduced by the amount of the reduction in heat caused by the reduced rotation speed of the motor of the inside fan (36). Consequently, an amount of energy corresponding to the reduction in the rotation speed of the inside fan (36) can be saved while maintaining the temperature inside the container at the target temperature. As a result, the container refrigeration device can perform energy saving operation while ensuring the quality of goods in the container.

According to the fourth aspect, when the temperature inside the container is stabilized, the operational rotation speed N of the compressor (30) is increased as the rotation speed of the inside fan (36) is increased. The cooling performance to cool the inside of the container can be increased by the amount of the increase in heat caused by the increased rotation speed of the motor of the inside fan (36). In addition, since the rotation speed of the inside fan (36) is increased, it is possible to make the temperature distribution uniform entirely inside the container. Thus, the temperature inside the container can be surely maintained at the target temperature. As a result, the container refrigeration device can perform energy saving operation while ensuring the quality of goods in the container.

According to the fifth aspect, the predetermined value B is corrected according to a change in the temperature inside the container caused by an increase in the rotation speed of the inside fan (36). Accordingly, the operational rotation speed of the compressor (30) can be set appropriately according to the change in the temperature inside the container. As a result, it is possible to cause the temperature inside the container to approach the target temperature.

According to the sixth aspect, since the opening degree of the expansion valve (32) is increased in accordance with the increase in the rotation speed of the inside fan (36), the cooling performance of the container refrigeration device can be increased by the amount of the increase in heat caused by the increased rotation speed of the motor of the inside fan (36). Consequently, the temperature inside the container can be maintained at the target temperature. As a result, the container refrigeration device can perform energy saving operation while ensuring the quality of goods in the container.

According to the seventh aspect, since the rotation of the inside fan (36) is alternately switched between the higher speed and the lower speed, it is possible to make the temperature distribution uniform entirely inside the container. In general, when an inside fan is controlled to operate at a low speed, air blown by the inside fan is unlikely to be distributed uniformly and entirely inside a container, and the temperature distribution inside the container can become nonuniform (uneven). In particular, in a container, an area opposite to the container refrigeration device (an area near the door of the container) may have a high temperature.

In contrast, according to the seventh aspect, since the rotation of the inside fan (36) is switched to not only the lower speed but also the higher speed, it is possible to make the temperature distribution uniform entirely inside the container. In particular, it is possible to make uniform the temperature of the area opposite to the container refrigeration device (the area near the door of the container). Thus, energy saving operation can be performed by causing the inside fan (36) to operate at the lower speed while maintaining the temperature inside the container at the target temperature. As a result, the container refrigeration device can perform energy saving operation while ensuring the quality of the goods in the container.

According to the eighth aspect, when the temperature of suction air is lower than the predetermined temperature, the inside fan (36) is caused to operate continuously at the lower speed without being switched to the higher speed. Specifically, a state in which the inside fan (36) is controlled to operate at the lower speed and the temperature of suction air having circulated in the container is lower than the predetermined temperature indicates that the temperature in the area opposite to the refrigeration device (the area near the door of the container) is also maintained at the target temperature. Accordingly, the temperature can be maintained at the target temperature entirely inside the container even with the inside fan (36) continuing rotating at the lower speed. As a result, the container refrigeration device can perform energy saving operation while ensuring the quality of the goods in the container.

BRIEF DESCRIPTION OF THE DRAWINGS

FIG. 6 is a graph showing a relation between a target temperature SP and an outdoor air temperature according to the embodiment.

DESCRIPTION OF EMBODIMENTS

An embodiment of the present disclosure will be described below in detail with reference to the drawings.

A container refrigeration device (10) of this embodiment is configured to cool the inside of a container (not shown). The container refrigeration device (10) also serves as a lid closing an opening in a lateral side of the body of the container.

Figure 1:
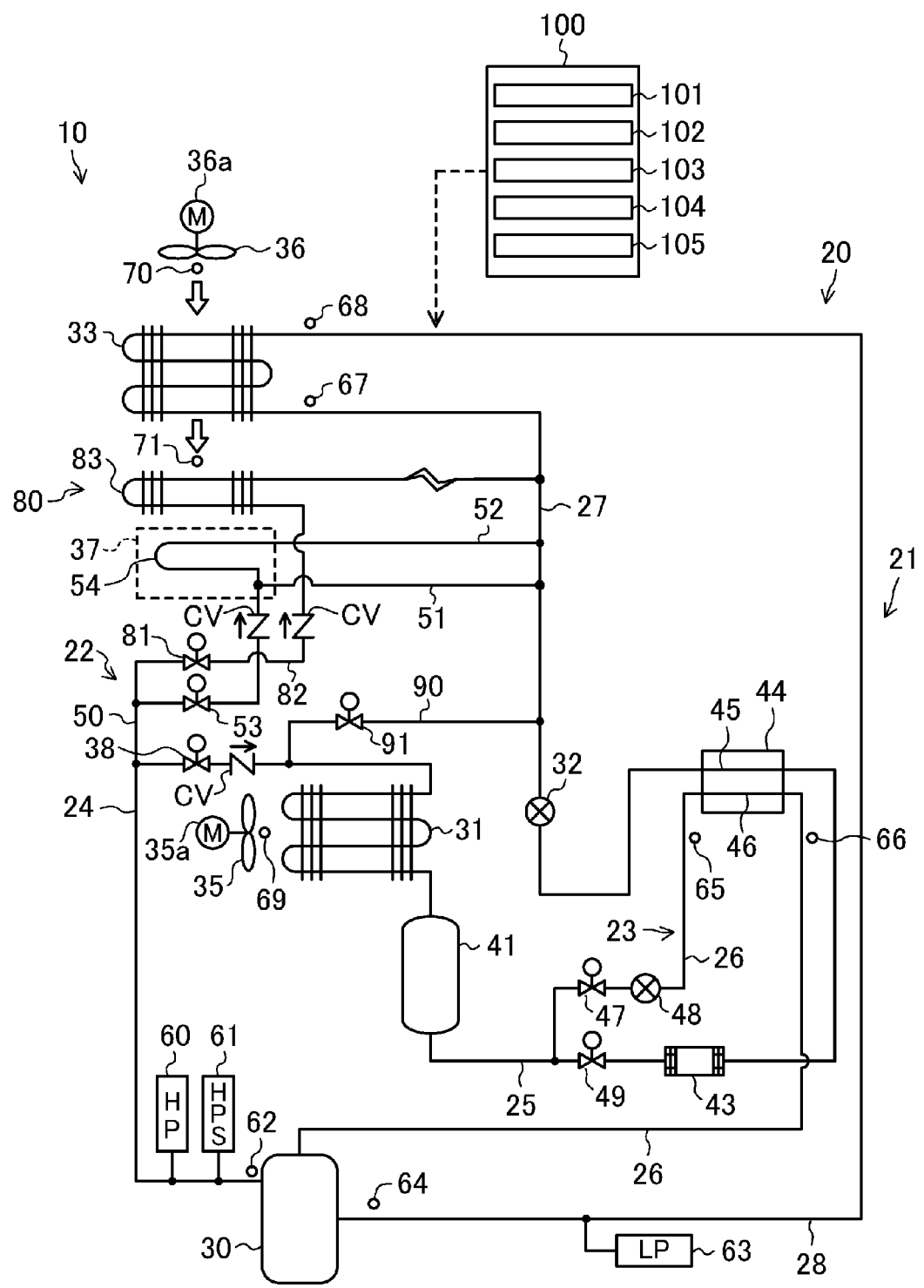
FIG. 1 is a piping system diagram illustrating a refrigerant circuit of a container refrigeration device according to an embodiment of the present disclosure.

As illustrated in FIG. 1, the container refrigeration device (10) includes a refrigerant circuit (20) configured to perform a refrigeration cycle by causing a refrigerant to circulate through the refrigerant circuit. The refrigerant circuit (20) includes a main circuit (21), a hot gas bypass circuit (22), a reheat circuit (80), and a subcooling circuit (23).

The main circuit (21) includes a compressor (30), a condenser (31), a main expansion valve (32), and an evaporator (33) which are sequentially connected in series with refrigerant pipes.

The compressor (30) includes a motor (not shown) configured to drive a compression mechanism. The rotation speed of the motor of the compressor (30) is controlled in multiple stages by an inverter. That is, the operational rotation speed at which the compressor (30) operates is variable.

Each of the condenser (31) and the evaporator (33) is a fin-and-tube heat exchanger. The condenser (31) is placed outside the container. In the condenser (31), air outside the container and the refrigerant exchange heat. The evaporator (33) is placed inside the container. In the evaporator (33), inner air of the container and the refrigerant exchange heat. A drain pan (37) is provided below the evaporator (33). The drain pan (37) is a flat container having an opening facing upward. The drain pan (37) collects therein frost, ice blocks having fallen from the evaporator (33), water condensed from air, etc. The opening degree of the main expansion valve (32) can be adjusted in multiple stages by a pulse motor. An outside fan (35) is provided near the condenser (31) whereas an inside fan (36) is provided neat the evaporator (33). The inside fan (36) is configured to supply air cooled by the evaporator (33) to the inside of the container. The outside fan (35) and the inside fan (36) are provided with an outside fan motor (35a) and an inside fan motor (36a), respectively.

A fourth on-off valve (38) and a check valve (CV) are sequentially provided on a high-pressure gas pipe (24) located between the compressor (30) and the condenser (31). The opening degree of the fourth on-off valve (38) can be adjusted in multiple stages by a pulse motor. The check valve (CV) allows the refrigerant to flow in a direction of an arrow indicated in FIG. 1, and prevents the refrigerant from flowing in the opposite direction.

A receiver (41), a second on-off valve (49), a dryer (43), and a subcooling heat exchanger (44) are sequentially provided on a high-pressure liquid pipe (25) located between the condenser (31) and the main expansion valve (32). The receiver (41) is provided downstream of the flow of the refrigerant from the condenser (31) and configured to receive the refrigerant having flowed out from the condenser (31) and separate the refrigerant into a saturated liquid and a saturated gas. The second on-off valve (49) is a solenoid valve which can be freely opened and closed. The dryer (43) is configured to capture moisture in the liquid refrigerant having flowed through the condenser (31). A liquid cogging prevention pipe (90) is connected to a point upstream of the refrigerant flow to the condenser (31) and to a point downstream of the refrigerant flow from the main expansion valve (32). The liquid clogging prevention pipe (90) is provided with a liquid clogging on-off valve (91).

The subcooling heat exchanger (44) cools the liquid refrigerant having flowed out from the condenser (31). The subcooling heat exchanger (44) includes a primary passage (45) and a secondary passage (46). Specifically, in the subcooling heat exchanger (44), the refrigerant flowing through the primary passage (45) and the refrigerant flowing through the secondary passage (46) exchange heat. The primary passage (45) is connected to the high-pressure liquid pipe (25) of the main circuit (21), and the secondary passage (46) is connected to a subcooling branch pipe (26) of the subcooling circuit (23). An inflow end of the subcooling branch pipe (26) is connected to a point of the high-pressure liquid pipe (25) between the receiver (41) and the second on-off valve (49). An outflow end of the subcooling branch pipe (26) is connected to a compression chamber (an intermediate pressure compression chamber) which is provided in the compressor (30) and midway through compression (at an intermediate pressure). In other words, the subcooling branch pipe (26) serves as a passage into which part of the liquid refrigerant in the high-pressure liquid pipe (25) is diverted to be allowed to flow into the intermediate pressure compression chamber of the compressor (30). A first on-off valve (47) and a subcooling expansion valve (48) are provided on an inflow side of the subcooling branch pipe (26) through which the refrigerant flows into the secondary passage (46). The first on-off valve (47) is a solenoid valve which can be freely opened and closed. The opening degree of the subcooling expansion valve (48) can be adjusted in multiple stages by a pulse motor. The subcooling expansion valve (48) constitutes a decompression mechanism for decompressing the refrigerant.

The hot gas bypass circuit (22) includes a main passage (50), and two branch passages (51, 52) branching off the main passage (50). The two branch passages include a first branch passage (51) and a second branch passage (52). An inflow end of the main passage (50) is connected to a point of the high-pressure gas pipe (24) between the fourth on-off valve (38) and the discharge side of the compressor (30). The main passage (50) is provided with a third on-off valve (53). The third on-off valve (53) is a solenoid valve which can be freely opened and closed.

The first branch passage (51) has an end connected to an outflow end of the main passage (50) and the other end connected a low-pressure liquid pipe (27) provided between the main expansion valve (32) and the evaporator (33). Likewise, the second branch passage (52) has an end connected to the outflow end of the main passage (50) and the other end connected to the low-pressure liquid pipe (27). The second branch passage (52) is made of a refrigerant pipe longer than the first branch passage (51). The second branch passage (52) includes a drain pan heater (54) which extends in a serpentine form along the bottom of the drain pan (37). The drain pan heater (54) is configured to heat the inside of the drain pan (37) with the refrigerant. Thus, the hot gas bypass circuit (22) constitutes a bypass circuit for feeding the refrigerant compressed by the compressor (30) (high temperature gaseous refrigerant discharged from the compressor (30)) to the evaporator (33).

The reheat circuit (80) includes a reheat passage (82). An inflow end of the reheat passage (82) is connected to a point of the high-pressure gas pipe (24) between the fourth on-off valve (38) and the discharge side of the compressor (30). The reheat passage (82) is provided with a fifth on-off valve (81). The fifth on-off valve (81) is a solenoid valve which can be freely opened and closed. The reheat passage (82) includes a reheat heat exchanger (83) and a capillary tube. The reheat heat exchanger (83) is configured to heat, during dehumidifying operation, air having been cooled and dehumidified in the evaporator (33) by causing the discharged refrigerant which has flowed into the reheat heat exchanger (83) and the air to exchange heat. The reheat heat exchanger (83) is a fin-and-tube heat exchanger. The capillary tube is configured to decompress the refrigerant flowing out from the reheat heat exchanger (83). Thus, the reheat circuit (80) constitutes a circuit for supplying part of the refrigerant compressed by the compressor (30) (i.e., the high-temperature gaseous refrigerant discharged from the compressor (30)) to the reheat heat exchanger (83).

The refrigerant circuit (20) also includes various sensors. Specifically, the high-pressure gas pipe (24) is provided with a high pressure sensor (60), a high pressure switch (61), and a discharge temperature sensor (62). The high pressure sensor (60) detects a pressure of the high-pressure gaseous refrigerant discharged from the compressor (30). The discharge temperature sensor (62) detects a temperature of the high-pressure gaseous refrigerant discharged from the compressor (30). A low-pressure gas pipe (28) located between the evaporator (33) and the compressor (30) is provided with a low pressure sensor (63) and a suction temperature sensor (64). The low pressure sensor (63) detects a pressure of the low-pressure gaseous refrigerant to be sucked into the compressor (30). The suction temperature sensor (64) detects a temperature of the low-pressure gaseous refrigerant to be sucked into the compressor (30).

In the subcooling branch pipe (26), an inflow temperature sensor (65) is provided on the inflow side of the secondary passage (46), and an outflow temperature sensor (66) is provided on the outflow side of the secondary passage (46). The inflow temperature sensor (65) detects a temperature of the refrigerant immediately before flowing into the secondary passage (46). The outflow temperature sensor (66) detects a temperature of the refrigerant immediately after flowing out from the secondary passage (46).

In the low-pressure liquid pipe (27), an inflow temperature sensor (67) is provided on the inflow side of the evaporator (33). The inflow temperature sensor (67) detects a temperature of the refrigerant immediately before flowing into the evaporator (33). In the low-pressure gas pipe (28), an outflow temperature sensor (68) is provided on the outflow side of the evaporator (33). The outflow temperature sensor (68) detects a temperature of the refrigerant immediately after flowing out from the evaporator (33).

Outside the container, an outdoor air temperature sensor (69) is provided on the suction side of the condenser (31). The outdoor air temperature sensor (69) detects a temperature of outdoor air immediately before being sucked into the condenser (31) (i.e., an outdoor air temperature). In the container, a suction air temperature sensor (70) is provided on the suction side of the evaporator (33), and a blown air temperature sensor (71) is provided on blowing-out side of the evaporator (33). The suction air temperature sensor (70) detects a temperature of inner air immediately before entering the evaporator (33). The blown air temperature sensor (71) detects a temperature (i.e. a blown air temperature SS) of the inner air immediately after passing through the evaporator (33).

The container refrigeration device (10) includes a controller (100) serving as a controlling section for controlling the refrigerant circuit (20). The controller (100) includes a compressor controller (101) for controlling an operational rotation speed N of the compressor (30), a fan controller (104) for controlling the fans (35, 36), a rotation speed controller (102) for controlling the operational rotation speed N of the compressor (30) according to an operational state of the inside fan (36), a valve controller (103) for controlling the valves (32, 38, 47-49, 53, 81), and a corrector (105) for correcting the operational rotation speed N of the compressor (30) according to the blown air temperature SS.

The compressor controller (101) is configured to control the operational rotation speed (operational frequency) N of the compressor (30) during cooling. The compressor controller (101) controls the operational rotation speed N of the compressor (30) such that the blown air temperature SS becomes equal to a target temperature SP of blown air. The blown air temperature SS corresponds to the temperature inside the container of the present disclosure, and the target temperature SP of blown air corresponds to the target temperature of the present disclosure. In this embodiment, the target temperature SP can be appropriately set to a temperature required by a user in the range from −30° C. to +30° C. Specifically, the compressor controller (101) is configured to reduce the operational rotation speed N of the compressor (30) when a temperature (the blown air temperature SS) of air blown into the container is lower than the target temperature SP, and to increase the operational rotation speed N of the compressor (30) when the blown air temperature SS is higher than the target temperature SP.

The fan controller (104) is configured to control the rotation speed of the inside fan motor (36a) when the temperature inside the container is stabilized. Here, the state in which the temperature inside the container is stabilized refers to a state in which the blown air temperature SS has continuously remained within a predetermined temperature range set relative to the target temperature SP (for ten minutes or more, for example). The fan controller (104) is configured to performing switching between a high state in which the inside fan motor (36a) operates at a high rotation speed to cause the inside fan (36) to rotate and supply a large volume of air, a low state in which the inside fan motor (36a) operates at a low rotation speed to cause the inside fan (36) to operate and supply a small volume of air, and a stop state in which the inside fan motor (36a) and the inside fan (36) are stopped. The rotation in the high state corresponds to rotation at higher speed of the present disclosure, and the rotation in the low state corresponds to rotation at lower speed of the present disclosure.

Figure 2:
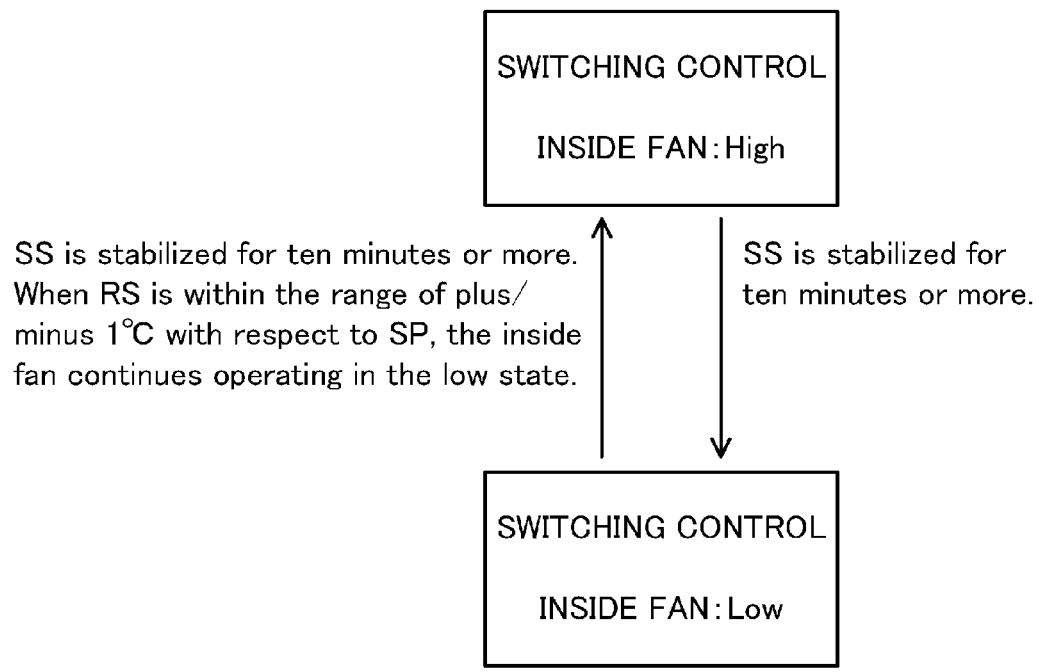
FIG. 2 illustrate switching control for switching an inside fan between a high state and a low state according to the embodiment.

As illustrated in FIG. 2, when the blown air temperature SS has remained in the vicinity of the target temperature SP (for ten minutes or more, for example), the fan controller (104) performs switching control to switch the rotation of the inside fan (36) between the high state and the low state. During the switching control, switching from the high state to the low state and switching from the low state to the high state are alternately performed at intervals of ten minutes.

This switching at the intervals of ten minutes is an example, and the present disclosure is not limited to this example. The intervals at which the rotation of the inside fan (36) is switched, i.e., the intervals of ten minutes correspond to predetermined intervals of the present disclosure.

When the rotation of the inside fan (36) is switched from the high state to the low state, the rotation speed of the inside fan motor (36a) of the inside fan (36) is reduced and heat generated by the inside fan motor (36a) decreases. On the other hand, when the rotation of the inside fan (36) is switched from the low state to the high state, the rotation speed of the inside fan motor (36a) of the inside fan (36) is increased and heat generated by the inside fan motor (36a) increases.

As illustrated in FIG. 2, upon performing the switching control to switch the rotation of the inside fan (36) from the low state to the high state, if a suction air temperature RS detected by the suction air temperature sensor (70) is within the range of plus/minus 1° C. with respect to the target temperature SP, the fan controller (104) carries out continuous control to cause the inside fan (36) to continue operating in the low state. The target temperature SP corresponds to the predetermined temperature of the present disclosure.

The rotation speed controller (102) is configured to change the operational rotation speed N of the compressor (30) in response to switching of the rotation speed of the inside fan motor (36a) performed by the fan controller (104). The rotation speed controller (102) performs control in different manners depending on switching of the rotation of the inside fan (36), from the high state to low state or from the low sate to the high state. The control performed by the rotation speed controller (102) will be described blow in detail.

When the fan controller (104) switches the inside fan (36) from the high state to the low state, the rotation speed controller (102) performs control to reduce the operational rotation speed N of the compressor (30) by a predetermined value A. Specifically, when the fan controller (104) switches the inside fan motor (36a) from the high rotation speed to the low rotation speed, heat generated by the inside fan motor (36a) decreases and the cooling performance of the container refrigeration device (10) becomes excessive. The rotation speed controller (102) accordingly reduces the operational rotation speed N of the compressor (30) by the predetermined value A. The reduced operational rotation speed (N−A) of the compressor (30) causes a flow rate of the refrigerant circulating through the refrigerant circuit (20) to decrease and the cooling performance of the container refrigeration device (10) to decrease, resulting in that the blown air temperature SS is maintained at the target temperature SP.

When the fan controller (104) switches the inside fan (36) from the low state to the high state, the rotation speed controller (102) performs control to increase the operational rotation speed N of the compressor (30) by a predetermined value B. Specifically, when the fan controller (104) switches the inside fan motor (36a) from the low rotation speed to the high rotation speed, heat generated by the inside fan motor (36a) increases and the cooling performance of the container refrigeration device (10) becomes insufficient. The rotation speed controller (102) accordingly increases the operational rotation speed N of the compressor (30) by the predetermined value B. The increased operational rotation speed (N+B) of the compressor (30) causes a flow rate of the refrigerant circulating through the refrigerant circuit (20) to increase and the cooling performance of the container refrigeration device (10) to increase, resulting in that the blown air temperature SS is maintained at the target temperature SP.

When the compressor (30) operating at an operational rotation speed adjusted by the rotation speed controller (102) causes the blown air temperature SS to come out of the range of plus/minus 0.5° C. with respect to the target temperature SP, the corrector (105) corrects the predetermined value A or B and thereby adjusts the operational rotation speed (the operational frequency) of the compressor (30).

Figure 3:
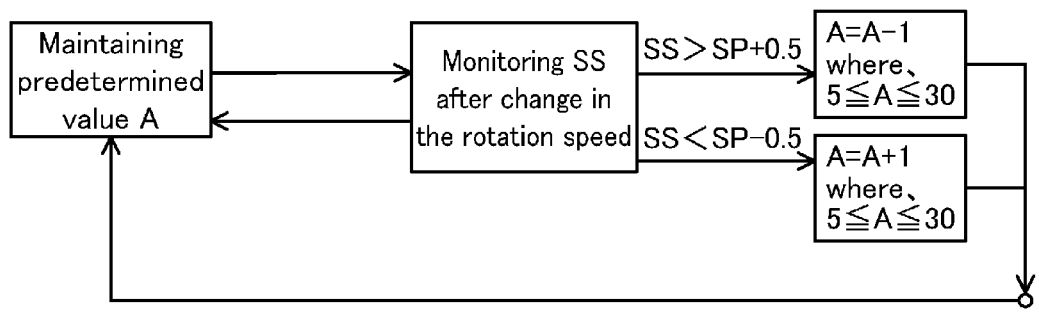
FIG. 3 illustrates a flow for setting a predetermined value A according to the embodiment.

As illustrated in FIG. 3, when the blown air temperature SS becomes higher than a temperature obtained by adding 0.5° C. to the target temperature SP (SS>SP+0.5) because of operation of the compressor (30) at the operational rotation speed (N−A) adjusted by the rotation speed controller (102), the corrector (105) subtracts 1 from the predetermined value A to set a corrected value A1 (A1=A−1) (A1<A), thereby increasing the operational rotation speed (the operational frequency) of the compressor (30) (N−A1). Specifically, when the blown air temperature SS is higher than the temperature obtained by adding 0.5° C. to the target temperature SP, the temperature inside the container becomes higher. In this case, the operational rotation speed of the compressor (30) is increased by setting the corrected value A1 that is smaller than the predetermined value A. Consequently, the flow rate of the refrigerant flowing through the refrigerant circuit (20) is increased, resulting in a decrease in the temperature inside the container. The predetermined value A is equal to or greater than 5 and equal to or smaller than 30.

On the other hand, when the blown air temperature SS becomes lower than a temperature obtained by subtracting 0.5° C. from the target temperature SP (SS<SP−0.5) because of operation of the compressor (30) at the operational rotation speed (N−A) adjusted by the rotation speed controller (102), the corrector (105) adds 1 to the predetermined value A to set a corrected value A2 (A2=A+1) (A<A2), thereby reducing the operational rotation speed (the operational frequency) of the compressor (30) (N−A2). Specifically, when the blown air temperature SS is lower than the temperature obtained by subtracting 0.5° C. from the target temperature SP, the temperature inside the container becomes lower. In this case, the operational rotation speed of the compressor (30) is reduced by setting the corrected value A2 that is greater than the predetermined value A. Consequently, the flow rate of the refrigerant flowing through the refrigerant circuit (20) is reduced, resulting in an increase in the temperature inside the container. The predetermined value A is equal to or greater than 5 and equal to or smaller than 30.

Figure 4:
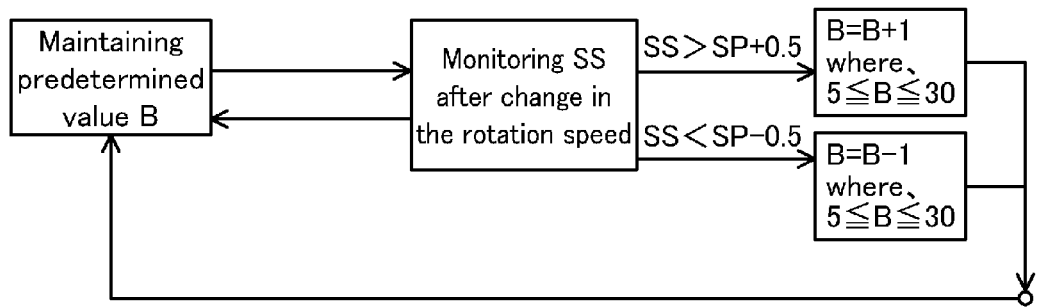
FIG. 4 illustrates a flow for setting a predetermined value B according to the embodiment.

As illustrated in FIG. 4, when the blown air temperature SS becomes higher than the temperature obtained by adding 0.5° C. to the target temperature SP (SS>SP+0.5) because of operation of the compressor (30) at the operational rotation speed (N+B) adjusted by the rotation speed controller (102), the corrector (105) adds 1 to the predetermined value B to set a corrected value B1 (B1=B+1) (B<B1), thereby increasing the operational rotation speed (the operational frequency) of the compressor (30) (N+B1). Specifically, when the blown air temperature SS is higher than the temperature obtained by adding 0.5° C. to the target temperature SP, the temperature inside the container becomes higher. In this case, the operational rotation speed of the compressor (30) is increased by setting the corrected value B1 that is greater than the predetermined value B. Consequently, the flow rate of the refrigerant flowing through the refrigerant circuit (20) is increased, resulting in a decrease in the temperature inside the container. The predetermined value B is equal to or greater than 5 and equal to or smaller than 30.

On the other hand, when the blown air temperature SS becomes lower than the temperature obtained by subtracting 0.5° C. from the target temperature SP (SS<SP−0.5) because of operation of the compressor (30) at the operational rotation speed (N+B) adjusted by the rotation speed controller (102), the corrector (105) subtracts 1 from the predetermined value B to set a corrected value B2 (B2=B−1) (B2<B), thereby reducing the operational rotation speed (the operational frequency) of the compressor (30) (N+B2). Specifically, when the blown air temperature SS is lower than the temperature obtained by subtracting 0.5° C. from the target temperature SP, the temperature inside the container becomes lower. In this case, the operational rotation speed of the compressor (30) is reduced by setting the corrected value B2 that is smaller than the predetermined value B. Consequently, the flow rate of the refrigerant flowing through the refrigerant circuit (20) is reduced, resulting in an increase in the temperature inside the container. The predetermined value B is equal to or greater than 5 and equal to or smaller than 30.

During cooling, when the fan controller (104) switches the inside fan motor (36*a*) from the high rotation speed to the low rotation speed, heat generated by the inside fan motor (36*a*) decreases, and the cooling performance of the container refrigeration device (10) becomes excessive. Accordingly, the valve controller (103) reduces the opening degree of the main expansion valve (32) by a predetermined degree. This predetermined degree is set depending on the opening degree of the main expansion valve (32) at the time of switching and changes in the operational rotation speed N of the compressor (30). When the opening degree of the main expansion valve (32) is reduced by the predetermined degree, the flow rate of the refrigerant flowing into the evaporator (33) of the refrigerant circuit (20) decreases. Consequently, the cooling performance of the container refrigeration device (10) decreases. Thus, the blown air temperature SS is maintained at the target temperature SP.

On the other hand, during the cooling, when the fan controller (104) switches the inside fan motor (36*a*) from the low rotation speed to the high rotation speed, heat generated by the inside fan motor (36*a*) increases, and the cooling performance of the container refrigeration device (10) becomes insufficient. Accordingly, the valve controller (103) increases the opening degree of the main expansion valve (32) by a predetermined degree. This predetermined degree is set depending on the opening degree of the main expansion valve (32) at the time of switching and changes in the operational rotation speed N of the compressor (30). When the opening degree of the main expansion valve (32) is increased by the predetermined degree, the flow rate of the refrigerant flowing into the evaporator (33) of the refrigerant circuit (20) increases. Consequently, the cooling performance of the container refrigeration device (10) increases. Thus, the blown air temperature SS is maintained at the target temperature SP.

—Operation—

Next, operation of the container refrigeration device (10) will be described. The operation of the container refrigeration device (10) is roughly classified into the "cooling operation," "defrosting operation," and "dehumidifying operation." The cooling operation is performed to cool the inside of the container to a relatively low temperature. Specifically, the cooling operation is performed such that the inside of the container is cooled or kept cool so as to preserve goods in transit (e.g., perishable foods) housed in the body of the container. The defrosting operation is performed by causing the refrigerant discharged from the compressor (30) to flow through the hot gas bypass circuit (22) so as to melt frost forming on the surfaces of a heat exchanger tube and the like of the evaporator (33) (frost removing operation). The defrosting operation is performed at predetermined intervals after starting of the cooling operation, and when the defrosting operation is ended, the cooling operation is performed again. The dehumidifying operation is performed to reduce the humidity inside the container. The defrosting operation and the dehumidifying operation are not detailed herein.

<Cooling Operation>

In the cooling operation, "cooling," "pumping down," and "heating" are carried out. Note that in FIGS. 3 and 4, reference character "SS" denotes the temperature (the blown air temperature) of blown air detected by the blown air temperature sensor (71), and reference character "SP" denotes the target temperature of the blown air temperature.

<Cooling in Cooling Operation>

Figure 5:
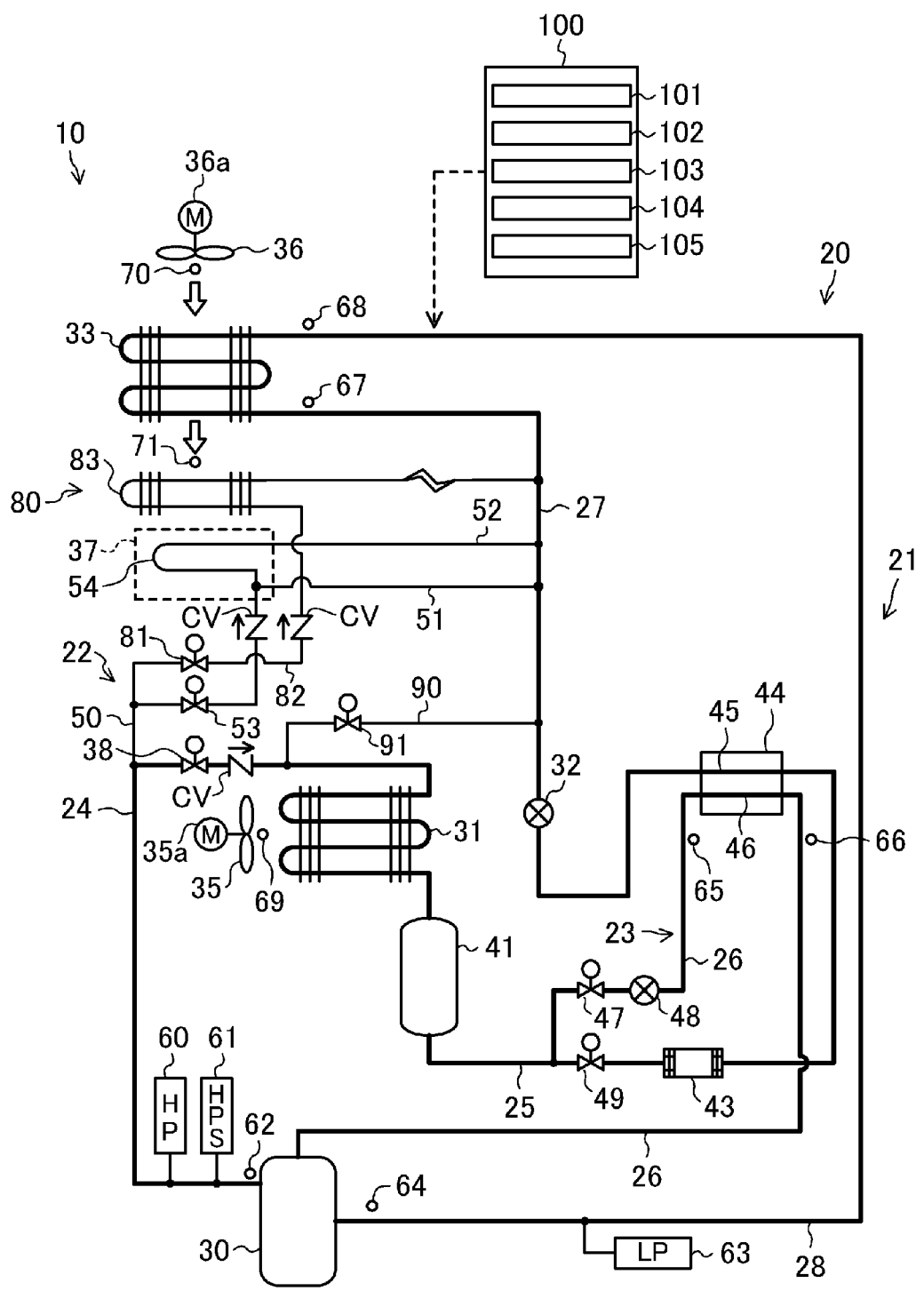
FIG. 5 is a piping system diagram illustrating cooling performed by the container refrigeration device of the embodiment.

The cooling illustrated in FIG. 5 is carried out in two modes, i.e., a "chilled mode" and a "frozen mode." The cooling in the "chilled mode" controls the temperature inside the container within the range from −10° C. to 30° C. The cooling in the "frozen mode" controls the temperature inside the container within the range from −10° C. to −30° C. Hereafter, the basic cooling is described first, and then, the "chilled mode" is described. The "frozen mode" is not detailed herein.

During the cooling in the cooling operation, the first on-off valve (47) and the second on-off valve (49) are opened, and the third on-off valve (53) and the fifth on-off valve (81) are closed. The fourth on-off valve (38) is fully opened, and the opening degrees of the subcooling expansion valve (48) and the main expansion valve (32) are appropriately adjusted. The compressor (30), the outside fan (35), and the inside fan (36) operate.

The refrigerant compressed by the compressor (30) condenses in the condenser (31), and then, passes through the receiver (41). Part of the refrigerant having passed through the receiver (41) flows directly through the low-pressure liquid pipe (27), and the rest of the refrigerant is diverted into the subcooling branch pipe (26). The refrigerant having flowed through the low-pressure liquid pipe (27) is decompressed by the main expansion valve (32), and thereafter, flows into the evaporator (33). In the evaporator (33), the refrigerant absorbs heat from the inner air of the container and evaporates. Consequently, the inner air of the container is cooled. The refrigerant having evaporated in the evaporator (33) is sucked into the compressor (30) and compressed again.

The refrigerant diverted into the subcooling branch pipe (26) passes through the subcooling expansion valve (48) and decompressed to have an intermediate pressure, and then, flows through the secondary passage (46) of the subcooling heat exchanger (44). In the subcooling heat exchanger (44), the refrigerant flowing through the primary passage (45) and the refrigerant flowing through the secondary passage (46) exchange heat. Consequently, the refrigerant flowing through the primary passage (45) is subcooled whereas the refrigerant flowing through the secondary passage (46) evaporates. The refrigerant having flowed out from the secondary passage (46) is sucked into the compression chamber at the intermediate pressure via an intermediate port of the compressor (30).

—Chilled Mode—

Next, chilled mode is described. In the chilled mode, as illustrated in FIG. 6, temperature control is performed according to five regions, i.e. first to fifth regions, into which cooing loads are divided based on the outdoor air temperature and the target temperature of the inside of the container. Among these regions, the first region has a highest cooling load whereas the fifth region has a reversed cooling load. In the chilled mode, the cooling loads decreases in a stepwise manner from the first region to the fifth region.

In the chilled mode, in accordance with switching of the rotation of the inside fan (36), the compressor controller (101) and the valve controller (103) control the operational rotation speed of the compressor (30) and the opening degree of the main expansion valve (32) such that the temperature inside the container becomes equal to the target temperature. Specifically, when the blown air temperature SS is lower than the target temperature SP, the compressor controller (101) reduces the operational rotation speed of the compressor (30), and the valve controller (103) reduces the opening degree of the main expansion valve (32). In this manner, the amount of the refrigerant circulating through the refrigerant circuit (20) decreases, and the cooling performance decreases. Consequently, the blown air temperature SS is caused to approach the target temperature SP, and the temperature inside the container is maintained.

On the other hand, when the blown air temperature SS is higher than the target temperature SP, the compressor controller (101) increases the operational rotation speed of the compressor (30), and the valve controller (103) increases the opening degree of the main expansion valve (32). In this manner, the amount of the refrigerant circulating through the refrigerant circuit (20) increases, and the cooling performance is enhanced. Consequently, the blown air temperature SS is caused to approach the target temperature SP, and the temperature inside the container is maintained.

In the fifth region, the outdoor air temperature is low and the target temperature SP is high. In the fifth region, the fan controller (104) causes the inside fan (36) to operate in the high state, and the so-called thermo-off operation in which the compressor (30) is stopped to cause the cooling operation to pause is performed. Under these circumstances, if the blown air temperature SS becomes lower than the target temperature SP, the inside of the container is under a reversed cooling load. In this case, the heating which will be described later is performed, thereby heating the inside of the container. The heating causes the blown air temperature SS to approach the target temperature SP, and the temperature inside the container is maintained.

In the fourth region, the outdoor air temperature is relatively low and a cooling load is imposed. In the fourth region, the thermo-off operation is performed, and the inside fan (36) is switched between the high state and the low state, thereby causing the blown air temperature SS to approach the target temperature SP.

In the third region, the outdoor air temperature is relatively low and a cooling load is imposed. In the third region, when the inside fan (36) operates in the high state, the cooling performance becomes greater than the cooling load of the inside of the container even with the compressor (30) operating at the minimum operational rotation speed. In this case, control is performed such that a thermo-on operation in which the inside fan (36) rotates in the high state alternate with the thermo-off operation in which the inside fan (36) rotates in the low state, thereby causing the blown air temperature SS to approach the target temperature SP.

In the second region, the outdoor air temperature is relatively high, the target temperature is relatively low, and a high cooling load is imposed. In the second region, when the blown air temperature SS is higher than the target temperature SP and the cooling load of the inside of the container is relatively high, the fan controller (104) switches the rotation of the inside fan (36) to the high state. In the second region, when the rotation of the inside fan (36) is in the high state, the compressor (30) is caused to operate continuously at the operational rotation speed N, thereby causing the blown air temperature SS to approach the target temperature SP.

Next, when the blown air temperature SS has continuously remained within the predetermined temperature range set relative to the target temperature SP (for ten minutes or more, for example), the fan controller (104) performs switching control to switch the rotation of the inside fan (36) to the low state. The switching control will be described later. Here, in the second region, when the inside fan (36) operates in the low state, the cooling performance becomes greater than the cooling load of the inside of the container even with the compressor (30) operating at the minimum operational rotation speed. In this case, the thermo-off operation is performed, thereby causing the blown air temperature SS to approach the target temperature SP.

In the first region, the outdoor air temperature is high, the target temperature SP is low, and the highest cooling load is imposed. In the first region, when the blown air temperature SS is higher than the target temperature SP and the cooling load of the inside of the container is relatively high, the fan controller (104) switches the inside fan (36) to the high state. In the first region, when the inside fan (36) is in the high state, the compressor (30) is caused to operate continuously at the operational rotation speed N, thereby causing the blown air temperature SS to approach the target temperature SP.

Next, when the blown air temperature SS has continuously remained within the predetermined temperature range set relative to the target temperature SP (for ten minutes or more, for example), the fan controller (104) performs switching control to switch the rotation of the inside fan (36) from the high state to the low state. The switching control will be described later. In the first region, since the cooling load becomes greater than the cooling performance even with the compressor (30) operating at the minimum operational rotation speed, the thermo-off operation is not performed.

—Switching Operation of Inside Fan—

As illustrated in FIG. 2, during the cooling operation in the first or second region, when the rotation of the inside fan (36) is in the high state and the blown air temperature SS has continuously remained within the predetermined temperature range set relative to the target temperature SP (for ten minutes or more, for example), the fan controller (104) performs the switching operation to switch the rotation of the inside fan (36) from the high state to the low state.

When the fan controller (104) performs the switching control to switch the rotation of the inside fan (36) from the high state to the low state, heat generated by the inside fan motor (36a) decreases, and accordingly, the cooling performance of the container refrigeration device (10) becomes excessive. The rotation speed controller (102) reduces the operational rotation speed N of the compressor (30) by the predetermined value A, and the compressor (30) operates at the reduced operational rotation speed (N−A). Consequently, the flow rate of the refrigerant circulating through the refrigerant circuit (20) decreases, and the cooling performance of the container refrigeration device (10) decreases, thereby maintaining the blown air temperature SS at the target temperature SP.

When the fan controller (104) switches the rotation of the inside fan (36) from the high state to the low state, the valve controller (103) reduces the opening degree of the main expansion valve (32) by the predetermined degree. In this manner, the flow rate of the refrigerant flowing into the evaporator (33) of the refrigerant circuit (20) decreases, and the cooling performance of the container refrigeration device (10) decreases, thereby maintaining the blown air temperature SS at the target temperature SP.

As illustrated in FIG. 3, when the compressor (30) operating at the operational rotation speed (N−A) causes the blown air temperature SS to become higher than the temperature obtained by adding 0.5° C. to the target temperature SP (SS>SP+0.5), the corrector (105) subtracts 1 from the predetermined value A to set the corrected value A1 (A1=A−1) (A1<A), thereby causing the compressor (30) to operate at the operational rotation speed (N−A1) that is greater than the operational rotation speed (N−A) before the correction. In this manner, the flow rate of the refrigerant flowing through the refrigerant circuit (20) increases, and the blown air temperature SS is caused to approach the target temperature SP.

When the compressor (30) operating at the operational rotation speed (N−A) causes the blown air temperature SS to become lower than the temperature obtained by subtracting 0.5° C. from the target temperature SP (SS<SP−0.5), the corrector (105) adds 1 to the predetermined value A to set the corrected value A2 (A2=A+1) (A<A2), thereby causing the compressor (30) to operate at the operational rotation speed (N−A2) that is lower than the operational rotation speed (N−A) before the correction. In this manner, the flow rate of the refrigerant flowing through the refrigerant circuit (20) decreases, and the blown air temperature SS is caused to approach the target temperature SP.

During the cooling operation in the first or second region, when the rotation of the inside fan (36) is in the low state and the blown air temperature SS has continuously remained within the predetermined temperature range set relative to the target temperature SP (for ten minutes or more, for example), the fan controller (104) performs the switching operation to switch the rotation of the inside fan (36) from the low state to the high state. That is, the fan controller (104) performs the switching control by which the rotation of the inside fan (36) is switched between the high state and the low state at intervals of ten minutes.

When the fan controller (104) performs the switching control to switch the rotation of the inside fan (36) from the low state to the high state, heat generated by the inside fan motor (36a) increases, and accordingly, the cooling performance of the container refrigeration device (10) becomes insufficient. The rotation speed controller (102) increases the operational rotation speed N of the compressor (30) by the predetermined value B, and the compressor (30) operates at the increased operational rotation speed (N+B). Consequently, the flow rate of the refrigerant circulating through the refrigerant circuit (20) increases, and the cooling performance of the container refrigeration device (10) increases, thereby maintaining the blown air temperature SS at the target temperature SP.

When the fan controller (104) switches the rotation of the inside fan (36) from the low state to the high state, the valve controller (103) increases the opening degree of the main expansion valve (32) by the predetermined degree. In this manner, the flow rate of the refrigerant flowing into the evaporator (33) of the refrigerant circuit (20) increases, and the cooling performance of the container refrigeration device (10) increases, thereby maintaining the blown air temperature SS at the target temperature SP.

As illustrated in FIG. 4, when the compressor (30) operating at the operational rotation speed (N+B) causes the blown air temperature SS to become higher than the temperature obtained by adding 0.5° C. to the target temperature SP (SS>SP+0.5), the corrector (105) adds 1 to the predetermined value B to set the corrected value B1 (B1=B+1) (B<B1), thereby causing the compressor (30) to operate at the operational rotation speed (N+B1) that is greater than the operational rotation speed (N+B) before the correction. In this manner, the flow rate of the refrigerant flowing through the refrigerant circuit (20) increases, and the blown air temperature SS is caused to approach the target temperature SP.

When the compressor (30) operating at the operational rotation speed (N+B) causes the blown air temperature SS to become lower than the temperature obtained by subtracting 0.5° C. from the target temperature SP (SS<SP−0.5), the corrector (105) subtracts 1 from the predetermined value B to set the corrected value B2 (B2=B−1) (B2<B), thereby causing the compressor (30) to operate at the operational rotation speed (N+B2) that is lower than the operational rotation speed (N+B) before the correction. In this manner, the flow rate of the refrigerant flowing through the refrigerant circuit (20) decreases, and the blown air temperature SS is caused to approach the target temperature SP.

In addition, when the fan controller (104) switches the rotation of the inside fan (36) from the low state to the high state, air blown out from the container refrigeration device (10) is distributed entirely inside the container and agitates the inner air of the container. Consequently, the temperature inside the container becomes uniform.

As illustrated in FIG. 2, in the switching control performed by the fan controller (104) to switch the rotation of the inside fan (36) from the low state to the high state, when the suction air temperature RS is within the range of plus/minus 1° C. with respect to the target temperature SP, the fan controller (104) carries out the continuous control to cause the inside fan (36) to continue operating in the low state.

<Pumping Down in Cooling Operation>

In the pumping down (not shown) of the cooling operation, the second on-off valve (49) is opened, and the first, third, and fifth on-off valves (47, 53, 81) are closed. The fourth on-off valve (38) is fully opened, and the subcooling expansion valve (48) and the main expansion valve (32) are fully closed. The compressor (30), the outside fan (35), and the inside fan (36) operate.

When the compressor (30) operates, the refrigerant in the line from the main expansion valve (32) that is fully closed to the suction port of the compressor (30) (i.e., in the low-pressure liquid pipe (27) and the low-pressure gas pipe (28)) is sucked into the compressor (30). The refrigerant is then discharged from the compressor (30), and is condensed in the condenser (31) to be liquefied. The liquid refrigerant is stored in the receiver (41). Thus, in the pumping down, the refrigerant of the refrigerant circuit (20) is collected in the receiver (41).

In the pumping down, the operational rotation speed (the operational frequency) of the compressor (30) is basically kept constant. The outside fan (35) operates at the maximum rotation speed. In this manner, condensation of the refrigerant in the condenser is facilitated.

<Heating in Cooling Operation>

The heating in the cooling operation is performed such that the high-temperature and high-pressure gaseous refrigerant having been compressed by the compressor (30) is caused to bypass the condenser (31), the receiver (41), the subcooling heat exchanger (44), and the main expansion valve (32) and to be supplied to the evaporator (33). The heating is performed when the temperature inside the container becomes lower than the target temperature and the inside of the container is excessively cooled. Immediately before the heating, the pumping down is performed.

In the heating, the second on-off valve (49) is closed, the third on-off valve (53) is fully opened, and the main expansion valve (32) is fully closed (0 pulse). The first, fourth, and fifth on-off valves (47, 38, 81) and the subcooling expansion valve (48) are basically fully closed (0 pulse). The compressor (30) and the inside fan (36) operate whereas the outside fan (35) is basically stopped.

The refrigerant having been compressed by the compressor (30) passes through the hot gas bypass circuit (22) to be supplied to the evaporator (33). Specifically, the high-temperature and high-pressure gaseous refrigerant flows through the main circuit (21) and then is diverted into the first branch passage (51) and the second branch passage (52). The refrigerant diverted into the second branch passage (52) passes through the drain pan heater (54), and then, merges with the refrigerant having flowed out from the first branch passage (51). After merging, the refrigerant flows into the evaporator (33), where the refrigerant dissipates heat into the inner air of the container. Consequently, the inner air of the container is heated, and the temperature inside the container is cause to approach the target temperature. The refrigerant having dissipated heat in the evaporator (33) is sucked into the compressor (30) to be compressed.

Advantages of Embodiment

According to the embodiment, when the blown air temperature SS has continuously remained within the predetermined temperature range set relative to the target temperature SP (for ten minutes or more, for example), the operational rotation speed N of the compressor (30) is reduced as the rotation speed of the inside fan (36) is reduced. Accordingly, the cooling performance to cool the inside of the container can be reduced by the amount of the reduction in heat caused by the reduced rotation speed of the inside fan motor (36a). In this manner, an amount of energy corresponding to the decrease in the rotation speed of the inside fan motor (36a) can be saved while maintaining the blown air temperature SS at the target temperature SP. As a result, the container refrigeration device (10) can perform energy saving operation while ensuring the quality of the goods in the container.

In addition, according to changes in the blown air temperature SS caused by the decrease in the rotation speed of the inside fan motor (36a), the predetermined value A is corrected. Consequently, the operational rotation speed of the compressor (30) can be appropriately set according to the changes in the blown air temperature SS. As the result, the blown air temperature SS is caused to approach the target temperature SP.

Further, since the opening degree of the main expansion valve (32) are reduced in accordance with the reduction in the rotation speed of the inside fan motor (36a), the cooling performance of the container refrigeration device (10) can be reduced by the amount of the reduction in heat caused by the reduced rotation speed of the inside fan motor (36a). In this manner, an amount of energy corresponding to the decrease in the rotation speed of the inside fan motor (36a) can be saved while maintaining the blown air temperature SS at the target temperature SP. As a result, the container refrigeration device (10) can perform energy saving operation while ensuring the quality of the goods in the container.

Further, when the blown air temperature SS has continuously remained within the predetermined temperature range set relative to the target temperature SP, the operational rotation speed N of the compressor (30) is increased in accordance with the increase in the rotation speed of the inside fan motor (36a). Accordingly, the cooling performance to cool the inside of the container can be increased by the amount of the increase in heat caused by the increased rotation speed of the inside fan motor (36a). Since the rotation speed of the inside fan motor (36a) is increased, the temperature distribution is kept uniform entirely inside the container. In this manner, the blown air temperature SS is surely maintained at the target temperature SP. As a result, the container refrigeration device (10) can perform energy saving operation while ensuring the quality of the goods in the container.

In addition, according to changes in the blown air temperature SS caused by the increase in the rotation speed of the inside fan motor (36a), the predetermined value B is corrected. Consequently, the operational rotation speed of the compressor (30) can be appropriately set according to the changes in the blown air temperature SS. As the result, the blown air temperature SS can be caused to approach the target temperature SP.

Moreover, since the opening degree of the main expansion valve (32) is increased in accordance with the increase in the rotation speed of the inside fan motor (36a), the cooling performance of the container refrigeration device (10) can be increased by the amount of the increase in heat caused by the increased rotation speed of the inside fan motor (36a). In this manner, the blown air temperature SS can be maintained at the target temperature SP. As a result, the container refrigeration device (10) can perform energy saving operation while ensuring the quality of the goods in the container.

Further, since the rotation of the inside fan motor (36*a*) is alternately switched between the higher speed and the lower speed, it is possible to make the temperature distribution uniform entirely inside the container. Specifically, in general, when an inside fan is controlled to operate at a low speed, air blown by the inside fan is unlikely to be distributed uniformly and entirely inside a container, and the temperature distribution inside the container can become nonuniform (uneven). In particular, in a container, an area opposite to the container refrigeration device (an area near the door of the container) may have a high temperature.

In contrast, according to this embodiment, since the rotation of the inside fan motor (36*a*) is switched to not only the lower speed but also the higher speed, it is possible to make the temperature distribution uniform entirely inside the container. In particular, it is possible to make uniform the temperature of the area opposite to the container refrigeration device (10) (the area near the door of the container). Thus, energy saving operation can be performed by causing the inside fan (36) to operate at the lower speed while maintaining the blown air temperature SS at the target temperature SP. As a result, the container refrigeration device (10) can perform energy saving operation while ensuring the quality of the goods in the container.

When the suction air temperature RS is within the temperature range of plus/minus 1° C. with respect to the target temperature SP, the inside fan motor (36*a*) is caused to operate continuously at the lower speed without being switched to the higher speed. Specifically, a state in which the inside fan motor (36*a*) is controlled to operate at the lower speed and the suction air temperature RS of the air circulating in the container is within the temperature range of plus/minus 1° C. with respect to the target temperature SP indicates that the temperature in the area opposite to the refrigeration device (the area near the door of the container) is also maintained at the target temperature. Accordingly, the temperature distribution inside the container can be maintained uniform even with the inside fan motor (36*a*) continuing rotating at the lower speed. It is also possible to make uniform the temperature in the area opposite to the refrigeration device (the area near the door of the container). As a result, the container refrigeration device (10) can perform energy saving operation while ensuring the quality of the goods in the container.

The forgoing embodiment is merely a preferred example in nature, and is not intended to limit the scope, applications, and use of the invention.

INDUSTRIAL APPLICABILITY

As described above, the present disclosure is useful for container refrigeration devices.

DESCRIPTION OF REFERENCE CHARACTERS

20 Refrigerant circuit
30 Compressor
31 Condenser
32 Main expansion valve
33 Evaporator
36 Inside fan
101 Compressor controller
102 Rotation speed controller
103 Valve controller
104 Fan controller
105 Corrector

The invention claimed is:

1. A container refrigeration device with a refrigerant circuit including a compressor, a condenser, an expansion mechanism, and an evaporator which are sequentially connected together, and with an inside fan configured to blow inner air having exchanged heat in the evaporator of the refrigerant circuit to an inside of a container, a rotation speed of the inside fan being variable, the container refrigeration device comprising:

a fan controller which reduces the rotation speed of the inside fan when a temperature inside the container has continuously remained within a predetermined temperature range set relative to a target temperature; and a rotation speed controller which, in response to the reduction of the rotation speed of the inside fan by the fan controller, reduces an operational rotation speed N of the compressor such that the temperature inside the container becomes equal to the target temperature.

2. The container refrigeration device of claim 1, further comprising:

a corrector, wherein the rotation speed controller is configured to reduce the operational rotation speed N of the compressor by a predetermined value A such that the temperature inside the container becomes equal to the target temperature, as the fan controller reduces the rotation speed of the inside fan, the corrector performs correction to reduce the predetermined value A when the temperature inside the container becomes higher than the target temperature because of operation at the operational rotation speed reduced by the rotation speed controller, and the corrector performs correction to increase the predetermined value A when the temperature inside the container becomes lower than the target temperature because of the operation at the operational rotation speed reduced by the rotation speed controller.

3. The container refrigeration device of claim 1, further comprising:

a valve controller, wherein the expansion mechanism is an expansion valve having a variable opening degree, and the valve controller reduces the opening degree of the expansion valve as the fan controller reduces the rotation speed of the inside fan.

4. The container refrigeration device of claim 1, wherein the fan controller increases the reduced rotation speed of the inside fan when the temperature inside the container is stabilized, and the rotation speed controller increases the operational rotation speed N of the compressor such that the temperature inside the container becomes equal to the target temperature, as the fan controller increases the rotation speed of the inside fan.

5. The container refrigeration device of claim 4, further comprising:

a corrector, wherein the rotation speed controller is configured to increase the operational rotation speed N of the compressor by a predetermined value B such that the temperature inside the container becomes equal to the target temperature, as the fan controller increases the rotation speed of the inside fan, the corrector performs correction to increase the predetermined value B when the temperature inside the container becomes higher than the target temperature because of operation at the operational rotation speed increased by the rotation speed controller, and the corrector performs correction to reduce the predetermined value B when the temperature inside the container becomes lower than the target temperature because of the operation at the operational rotation speed increased by the rotation speed controller.

6. The container refrigeration device of claim 4, further comprising:

a valve controller, wherein the expansion mechanism is an expansion valve having a variable opening degree, and the valve controller increases the opening degree of the expansion valve as the fan controller increases the rotation speed of the inside fan.

7. The container refrigeration device of claim 1, wherein the rotation speed of the inside fan is switchable between at least two speeds including a higher speed and a lower speed, and the fan controller is configured to perform switching control to switch the rotation of the inside fan between the higher speed and the lower speed at predetermined intervals.

8. The container refrigeration device of claim 7, wherein when a temperature of suction air sucked from the inside of the container is equal to or lower than a predetermined temperature during the switching control, the fan controller performs a low speed control to cause the inside fan to operate continuously at the lower speed.

* * * * *